United States Patent [19]
Christopher

[11] 3,794,993
[45] Feb. 26, 1974

[54] COORDINATE GENERATION SYSTEM
[75] Inventor: Daryl J. Christopher, Framingham, Mass.
[73] Assignee: Raytheon Company, Lexington, Mass.
[22] Filed: June 22, 1972
[21] Appl. No.: 265,121

[52] U.S. Cl.............................. 343/5 DP, 343/5 EM
[51] Int. Cl.............................................. G01s 7/12
[58] Field of Search............... 343/5 R, 5 DP, 5 EM

[56] References Cited
UNITED STATES PATENTS
| | | | |
|---|---|---|---|
| 3,178,709 | 4/1965 | White et al. | 343/5 R X |
| 3,262,109 | 7/1966 | Swale et al. | 343/5 DP X |
| 3,292,034 | 12/1966 | Braaten | 343/5 DP X |
| 3,343,159 | 9/1967 | Van Breugel | 343/5 R |

*Primary Examiner*—T. H. Tubbesing
*Attorney, Agent, or Firm*—Joseph D. Pannone; David M. Warren; Milton D. Bartlett

[57] ABSTRACT

A coordinate generation system providing deflection signals for the X and the Y coordinates of an oscilloscope type display for producing a line on the display having a direction synchronized with a source of direction. Such a source of direction is typically a radar antenna in which case the line produced on the display is directed in the direction of the antenna such as in a plan position indicator (PPI). The coordinate generation system utilizes a sequence of pulses, each of which indicates a predetermined incremental change in the direction of the source of direction, for addressing a memory which stores corresponding incremental changes in the magnitude of the deflection signals to be applied to the X and to the Y coordinates of the display. The stored increments are accumulated and converted to analog signals suitable for driving the X and the Y coordinate axes of the display.

24 Claims, 8 Drawing Figures

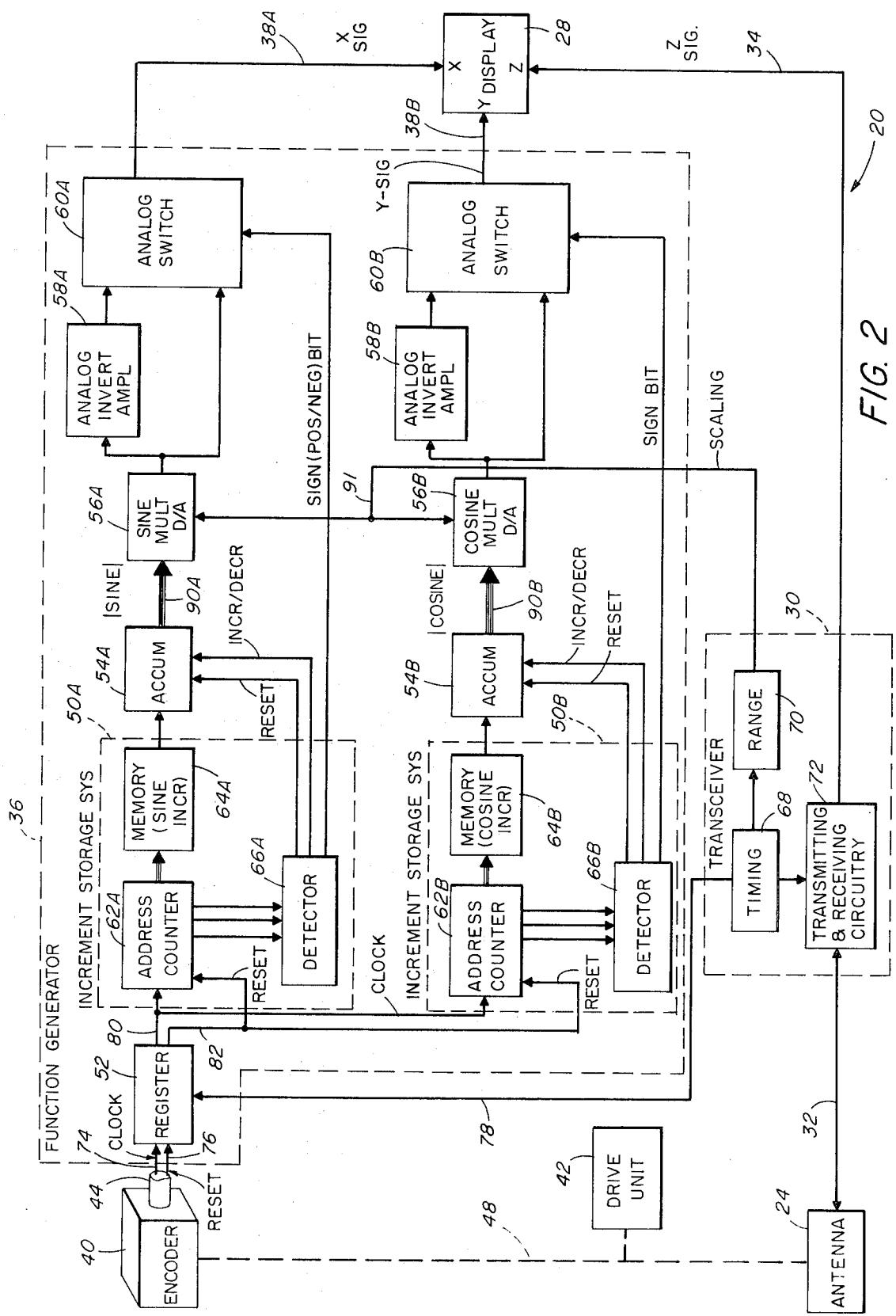

| ANGLE (DEGREES) | SINE | COSINE | SINE INCREMENT | COSINE DECREMENT | ADDRESS | SWITCH POSITION |
|---|---|---|---|---|---|---|
| 0 | 0.00 | 1.00 | — | — | — | 1 |
| 11.25 | 0.19 | 0.98 | 19 | 02 | A | 1 |
| 22.50 | 0.38 | 0.92 | 19 | 06 | B | 1 |
| 33.75 | 0.56 | 0.83 | 18 | 09 | C | 1 |
| 45.00 | 0.71 | 0.71 | 15 | 12 | D | 1 |
| 56.25 | 0.83 | 0.56 | 12 | 15 | D | 2 |
| 67.50 | 0.92 | 0.38 | 09 | 18 | C | 2 |
| 78.75 | 0.98 | 0.19 | 06 | 19 | B | 2 |
| 90.00 | 1.00 | 0.00 | 02 | 19 | A | 2 |

COORDINATE GENERATION SYSTEM

GOVERNMENT CONTRACT

The invention herein described was made in the course of or under a contract or subcontract thereunder, (or grant) with the Department of Defense.

BACKGROUND OF THE INVENTION

In the past, both analog and digital systems have been utilized in radar systems for developing deflection signals for the X and the Y coordinates of a display and for synchronizing these deflection signals with the position of a rotating antenna. Where high accuracies are required in the generation of these deflection signals, the use of ganged course and fine resolvers becomes cumbersome in the analog systems of the prior art. Accordingly, it has become the practice in modern systems to utilize digital techniques in which multiple terminal encoders, mechanically coupled to the rotating antenna, transmit multiple bit angle data for each increment of antenna rotation. Or, alternatively, the prior art digital systems may utilize an encoder transmitting only a sequence of clock pulses synchronized to the antenna rotation with each clock pulse representing an increment in antenna rotation, these clock pulses being utilized to drive circuitry which operates with multiple bit signals for the providing of multiple bit deflection signals. A problem arises in the digital systems of the prior art in that a substantial amount of digital equipment is required to process the multiple bit signals since many bits are required in highly accurate systems.

SUMMARY OF THE INVENTION

The preceding problem of prior art systems is overcome with a coordinate generation system in accordance with the invention which utilizes a sequence of pulses synchronized to a source of direction, such as a radar antenna, for addressing a memory which stores incremental changes in display coordinate signals. In a preferred embodiment of the invention, these incremental signals are simply the least significant bit of multiple bit sine and cosine signals utilized in the driving of the X and the Y coordinates of a fixed display deflection system. The angular increments represented by each of the pulses in the sequence of pulses from the source of direction is sufficiently small such that the value of the sine and the value of the cosine never changes by more than one least significant bit for each increment in the change of direction. An accumulator is provided for combining these increments into a multiple bit digital number which is then converted to an analog signal suitable for driving a deflection axis of the display. The memory may store increments of the sine and the cosine waveform or, alternatively, the sine and the cosine functions may be modified to compensate for any nonlinearities in the display deflection system. And, if desired, the stored function increments may be selected so as to provide deflection signals resulting in a curved trace rather than a straight line, as may be useful, for example, in producing a symbol on the display. Alternative embodiments for implementing the incremental storage feature are disclosed.

BRIEF DESCRIPTION OF THE DRAWINGS

The aforementioned aspects and other features of the invention are explained in the following description taken in connection with the accompanying drawings wherein:

FIG. 2 is a block diagram of the coordinate generation system utilized in FIG. 1;

DESCRIPTION OF THE PREFERRED EMBODIMENT

Figure 1:
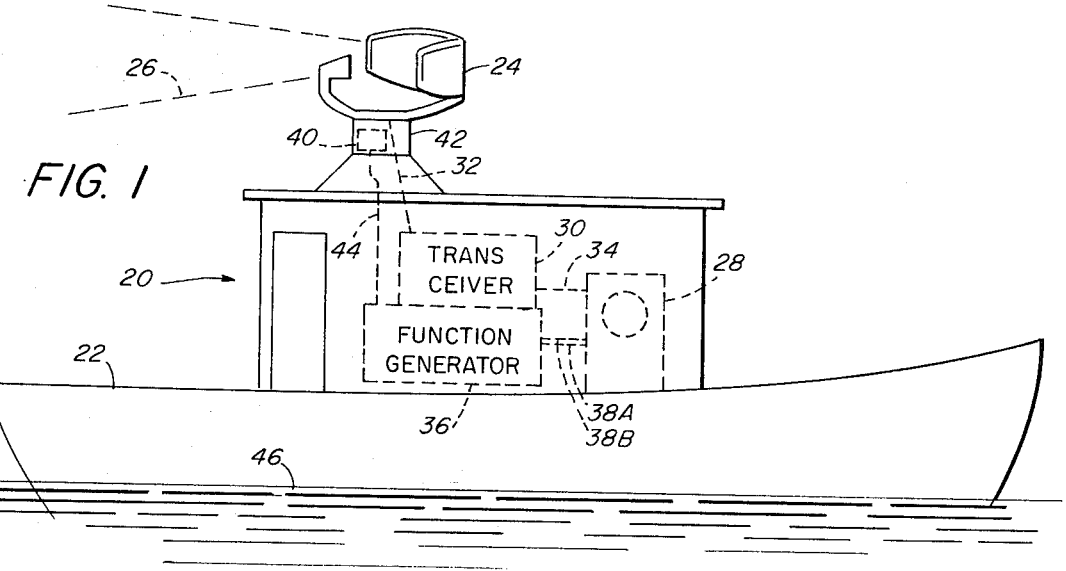
FIG. 1 shows a boat equipped with a radar system incorporating the coordinate generation system of the invention for providing a plan position indicator (PPI) display synchronized with the direction of a radar beam emanating from the antenna.

Referring now to FIG. 1, there is seen a pictorial representation of the coordinate generation system 20 of the invention mounted on a boat 22 and utilized in a radar system comprising an antenna 24 emitting a beam 26 of radiation, a display 28 shown in dashed lines within the boat 22, a transceiver 30 interconnecting the antenna 24 and the display 28 via lines 32 and 34, a function generator 36 coupled to the display 28 via lines 38A–B, and an encoder 40 mechanically connected to a drive unit 42 of the antenna 24 and coupled via line 44 to the function generator 36. The coordinate generation system 20 may equally well be utilized in a sonar system (not shown) in which case the antenna 24 would be a sonic radiator displosed within the ocean 46. As the boat 22 sails through the ocean 46, the radar antenna 24 is rotated by the drive unit 42 so that the beam 26 scans azimuthally the region around the boat 22. The transceiver 30 is of a well-known form utilized in radar systems for providing a signal to be transmitted via the antenna 24 and for receiving signals reflected from distant objects along the direction of the beam 26 to the antenna 24. The transceiver 30 provides signals along line 34 for indicating on the display 28 the presence of nearby objects. The encoder 40 transmits a succession of clock pulses along line 44 to the function generator 36, the repetition frequency of these clock pulses being synchronized with the rate of rotation of the antenna 24 and its drive unit 42 so that each of these clock pulses represents a specific increment in the angle of rotation of the antenna 24 about its axis. The function generator 36, in accordance with the invention, utilizes these clock pulses on lone 44 as well as a reset pulse also provided on line 44 to generate X and Y deflection signals on lines 38A–B for providing the well-known radial trace of a PPI for the display 28.

Referring now to FIG. 2, there is seen a detail block diagram of the coordinate generation system 20 showing the function generator 36, the encoder 40, mechanically connected via dashed line 48 to the drive unit 42 and the antenna 24, the display 28 and the transceiver 30, all of which have been seen previously in FIG. 1. The function generator 36 is seen comprising two increment storage systems 50A-B each of which is coupled by a register 52 to the line 44 and the encoder 40, two accumulators 54A-B, two digital-to-analog converters 56A-B, two analog inverting amplifiers 58A-B and two analog switches 60A-B. The suffixes A and B are appended to identify respectively the components utilized in generating the X and Y deflection signals. Thus, the incremental storage system 50A, the accumulator 54A, the digital-to-analog converter 56A, the analog inverting amplifier 58A and the analog switch 60A are utilized in generating the X deflection signal on line 38A while the corresponding ones of these components labeled with the letter B are utilized for generating the Y deflection signal on line 38B. The increment storage systems 50A-B are seen comprising respectively address counters 62A-B, memories 64A-B which in the preferred embodiment have the form of read-only memories, and detectors 66A-B of binary numbers. The transceiver 30 is seen comprising a timing unit 68, a ranging unit 70 and circuitry 72 transmitting and receiving signals via the antenna 24.

The line 44 from the encoder 40 is depicted in FIG. 2 as being a cable having internal electrical conductors for transmitting clock pulse signals and a reset signal, these conductors being represented diagrammatically in the figure by lines 74 and 76 respectively for the clock and reset signals. The clock and reset signals pass through the register 52 in accordance with timing signals on line 78 from the timing unit 68 and appear respectively on lines 80 and 82. The purpose of the register 52 is to temporarily store the clock and reset signals during the relatively short time interval in which a line is constructed upon the face of the display 28, it being readily apparent that if an additional clock signal arrives at the increment storage systems 50A and B while such a line is being constructed on the face of the display 28, the remaining portion of the line would be redirected so that an undesirable bend would appear in the line. Accordingly, the timing unit 68 permits the clock and reset signals to be read out of the register 52 only during the intervals between the construction of the traces on the display 28. Alternatively, the register 52 may be deleted if the timing unit 68 and the antenna drive unit 42 are synchronized such as by providing synchronizing pulses (not shown) from the drive unit 42 to the timing unit 68, such a synchronization insuring that no clock or reset signal would appear on lines 74 and 76 during the writing of a trace on the display 28, but rather that one clock pulse would appear between each trace to update the direction of the next trace.

The increment storage systems 50A-B operate as follows. A reset signal on line 82 is applied to each address counter 62A-B to set it to a predetermined binary number. Assuming that a reset signal is transmitted once per revolution of the antenna 24, for example, whenever the antenna azimuth angle is zero relative to the central line of the boat 22 of FIG. 1, both address counters 62A-B are set to zero, and the detectors 66A-B, upon detecting the number zero, transmit reset signals to the accumulators 54A-B to reset the accumulator 54A to the value of zero while resetting the accumulator 54B at a maximum value, a maximum value of 1023 being utilized in the preferred embodiment of the invention. The maximum value in the accumulator 54B is unity, corresponding to the cosine of 90 degrees, and is applied via the line 90B to the digital-to-analog converter 56B which converts this binary number to a maximum deflection voltage for the Y axis of the display 28, while the value of zero to which the accumulator 54A has been reset is tranmitted via the line 90A to the digital-to- analog converter 56A to provide a zero deflection on the X axis of the display with the resultant trace being vertically directed to show that the antenna 24 is facing the bow of the boat 22. The lines 90A-B are drawn as heavy lines to indicate the transmission of multibit numbers. It is understood that the diagram of FIG. 2 relates to a ship's heading oriented display, and that a north oriented display could be constructed by utilizing a well-known form of coordinate converter (not shown) coupled to a gyrocompass (not shown).

Referring now specifically to the operation of the components which provide the X signal on line 38A, it is noted that, upon the resetting of the address counter 62A to zero, the data in the memory slot of the memory 64A at the zero address is made available to the accumulator 54A. When the next clock signal arrives on line 80, the address counter 62A counts a count of one and addresses the memory 64A to make available to the accumulator 54A such data as is stored in the number one bin of the memory 64A. And, similarly, upon appearances of successive clock pulses on line 80, the address counter 62A advances to successively higher counts and addresses the memory 64A to tranmit data from the corresponding bins to the accumulator 54A. The sine memory 64A stores information with respect to the value of a sine wave relative to an angle corresponding to the digital number of the address counter 62A. Since the memory 64A stores only the least significant bit of each value of the sinusoid function, each memory bin has a capacity of only one bit, there being in the preferred embodiment 2048 bins of memory and the address counter 62A counts from zero to 2047 inclusive. The encoder 40 transmits 2048 clock pulse signals on line 74 for each quadrant or 90° rotation of the antenna 24 for a total of 8192 pulses per revolution of the antenna 24. As has already been noted, the accumulator 54A accumulates a maximum count of 1023 which is a 10-bit binary number. This is only one-half the total number of memory bins provided by the memory 64, the reason being that the increments in antenna angular position must be sufficiently small such that successive values of the sinusoid provided by the memory 64A must not differ in size by more than one LSB (least significant bit). It has been found that by transmitting 2048 (11 bits) clock signals per quadrant, a 10-bit accuracy can be provided in the deflection signals without having the value of the sinusoid increased by more than one LSB, it is only necessary to store in the memory 64A the LSB portion of each value of the sinusoid. Similar comments apply to the address counter 62B and the cosine memory 64B.

As is well known, the value of the sinusoid proceeds from zero to unity during the first quadrant and then reverts to zero in the second quadrant, this procedure being repeated during the third and fourth quadrants. Since the same values of the sinusoid appear repetitively during each revolution of the antenna 24, it is only necessary to store the set of values appearing during one quadrant of the revolution of the antenna 24. In the event that it is desired to correct nonlinearities in the deflection system of the display 28, then the data stored within the memory 64A must be altered slightly to correct for the nonlinearity, the alteration in the data differing from one quadrant to the next. Under such circumstances, it is necessary to store within the memory 64A sufficient data for an entire revolution of the antenna 24, this being in the case of the preferred embodiment of the invention, 8192 storage bins each of which stores one LSB. For ease of explaining the invention, the diagram of FIG. 2 is drawn for the case where data for all four quadrants is stored within the memory 64A; a system wherein a memory stores only the data of one quadrant will be described hereinafter with reference to FIG. 4.

Since the value of the sine appearing on the line 90A increases and decreases periodically during each revolution of the antenna 24, the accumulator 54A must be made to increment its value with each bit received from the memory 64A during one quadrant and to decrement its value with each bit received from the memory 64A during the next quadrant of revolution of the antenna 24. The detector 66A provides an increment/decrement signal for the accumulator 54A in response to the most significant bit and the second most significant bit of the binary number provided by the address counter 62A. Thus, during the interval of time when the numbers of the address counter 62A run from zero through 2047, the detector 66A commands the accumulator 54A to increment its value, while during the interval of time when the numbers 2048 through 4095 appear at the address counter 62A, the detector 66A commands the accumulator 54A to decrement its count. The increment command is again provided by the detector 66A when the address counter 62A shows a count of 4096 and a decrement command when the count reaches 6144. Since the sinusoid alters its sign from positive to negative as the antenna 24 passes the 180° point, while the accumulator 54A only provides positive values or the absolute value of the sine on the line 90A, the detector 66A provides a sign bit indicating a positive or negative value of the sinusoid, the positive sine being indicated by the detector 66A when the count of the address counter 62A has a value of from zero to 4095 and the negative value when the address counter shows a count of from 4096 to 8191. The analog signal provided by the digital-to-analog converter 56A is applied via the inverting amplifier 58A to the switch 60A as well as directly to the switch 60A so that the output of the switch on line 38A may be either the inverted (negative) value of the sinusoid or the direct (positive) value of the sinusoid.

Similar commments apply to the operation of the components providing the Y signal on line 38B except for a slight difference in operation, namely, that the detector 66B applies a decrement signal to the accumulator 54B when the number zero appears in the address counter 62B and applies an increment signal when the number 2048 appears in the address counter 62B, these commands being repeated during successive quadrants of the antenna rotation. A sign bit indicating a positive value of the cosine is provided by the detector 66B when the address counter 62B shows a count of 6144 and a negative value of the cosine when the address counter 62B shows a count of 2048. This sign bit is applied to the analog switch 60B for selecting the inverted output of the amplifier 58B or the direct output of the cosine digital-to-analog converter 56B in the same manner as was described above with reference to the analog switch 60A and the analog inverting amplifier 58A.

Each digital-to-analog converter 56A-B is provided with a multiplying capability for multiplying the values of the sinusoids on lines 90A-B by the output signal on line 91 of the ranging unit 70, this output signal being a sweep waveform which serves to scale the value of the sine function applied to the digital-to-analog converter 56A and the cosine function applied to the digital-to-analog converter 56B with the result that two ramp waveforms appear at the X and Y defection signals on lines 38A and 38B. These two ramp deflection signals provide a linear trace on the display 28 having a horizontal component proportional to the X signal on line 38A and a vertical component proportional to the Y signal on line 38B. Upon successive updatings of the addresses provided by the address counters 62, the relative magnitudes of the X and Y ramp deflection signals on the lines 38A and 38B varies so that successive traces on the display 28 are seen to pivot about the center of the display in the manner of a PPI.

It is interesting to note with respect to the two ramp waveforms appearing on the lines 38A-B, that if a constant voltage were applied to the reference input of each analog-to-digital converter 56A-B on line 91 in lieu of the sweep waveform, then the X and Y deflection signals on lines 38A-B would correspond to the coordinates of a circular trace or arc on the display 28, with the end of the arc corresponding to the orientation of the antenna 24, these X-Y deflection signals are ideally suited for driving a resolver (not shown) or similar type electromechanical system wherein it is desired to orient a mechanical device in accordance with a prescribed direction. This interconnection with the resolver is implemented by connecting the signals on lines 38A-B to the X and Y (or north and south) terminals of the resolver while applying a (preferably) constant voltage on the line 91.

As was mentioned before, if a clock signal on line 80 were applied to the address counters 62A-B during the interval of time in which a trace is being produced on the display 28, the relative amplitudes of the X and Y deflection signals would vary providing a bend in the trace; however, the range sweep provided by the ranging unit 70 is synchronized via the timing unit 68 to the register 52 and, accordingly, the range sweep may be performed slowly or rapidly for displaying respectively a long range or a short range while being free of the appearance of any clock signals on line 80. It is apparent that if a long range is displayed, a number of clock signals will be temporarily stored in the register 52 during each of the long-range range sweeps with the result that successive traces on the display 28 will be more further spaced apart in azimuth angle. The timing unit 68 also synchronizes the operation of the circuitry 72 with that of the ranging unit 70 so that target returns appear on the Z axis signal on line 34 during successive generations of the range sweep by the ranging unit 70 in a manner well known to radar systems.

It is also interesting to note that while the function generator 36 has been depicted as having two channels for providing the X and the Y coordinate signals, an additional channel (not shown) similarly comprising an increment storage system, accumulator, digital-to-analog converter with multiplying capability, inverting amplifier and switch may similarly be connected to a register such as the register 52 and a source of scaling voltage such as the ranging unit 70 in a multiaxis display in which it is desired to position a writing stylus or other indicating means in three dimensions.

Figure 3:
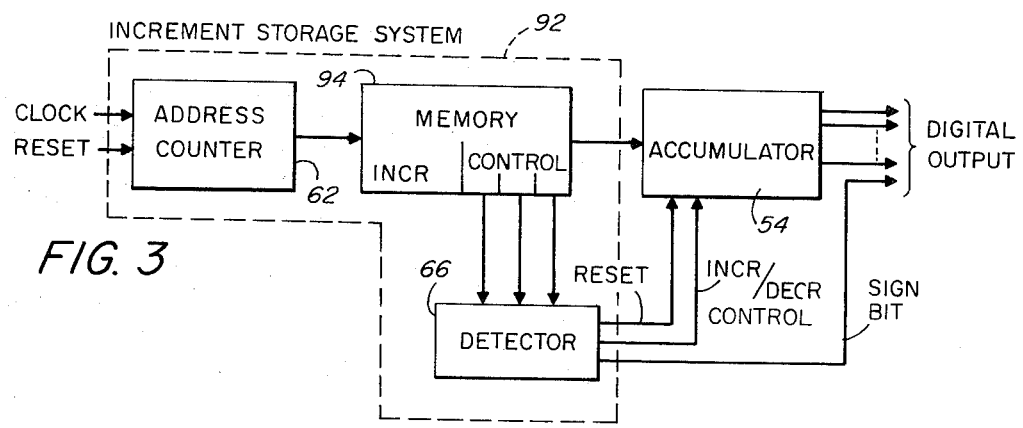
FIG. 3 is a block diagram of an alternative embodiment of an increment storage system utilized in the coordinate generation system of FIG. 2.

Referring now to FIG. 3, there is shown a block diagram of an increment storage system 92 which is an alternative embodiment to the increment storage system 50A or 50B previously described with reference to FIG. 2. The legends A and B are dropped here since FIG. 3 is equally applicable for the X and the Y deflection signals. In FIG. 3 there are seen the address counter 62, the detector 66 and the accumulator 54 previously seen in FIG. 2. A memory 94 is provided for storing increments of the function (such as the sinusoid) to be applied to the deflection system of the display 28 as was done by the memory 64 of FIG. 2, however, the memory 94 furthermore comprises additional storage space for each memory and for storing a multiple bit number which serves as the control signal which is then detected by the detector 66. Recalling the operation of the increment storage system 50A of FIG. 2, the detector 66A received the most significant bits of the address counter 62A and provided output control signals in response to the particular quadrant indicated by these most significant bits. By way of contrast, in the embodiment of FIG. 3, the binary number represented by the most significant bits is placed in storage in the same bin as is stored the corresponding function increment. Thus, when the address counter 62 addresses a specific bin within the memory 94, the detector 66 senses the multibit number which indicates which control signal is to be applied to the accumulator 54 and the analog switch seen at FIG. 2. The implementation of FIG. 3 is useful when a nonsinusoidal function is to be applied to the deflection system of the display 28. The memory 94 may be a core memory, a read-only memory or disc or a tape memory. A further advantage of the memory 94 is that the detector 66 may be eliminated by connecting the reset terminal of the accumulator 54 directly to a control bit of the memory 94, and similarly connecting the increment/decrement control and the sine bit control to respective control bits of the memory 94.

It is also interesting to note that in the event that a non-sinusoidal function, such as some arbitrary wavy line function, is to be generated by using the increment storage system 92 and the accumulator 54, the increment/decrement control may be utilized on numerous occasions to increment and decrement the accumulator 54 to provide for a wavy line type function useful for character generation as will be described with reference to FIG. 7.

Figure 4:
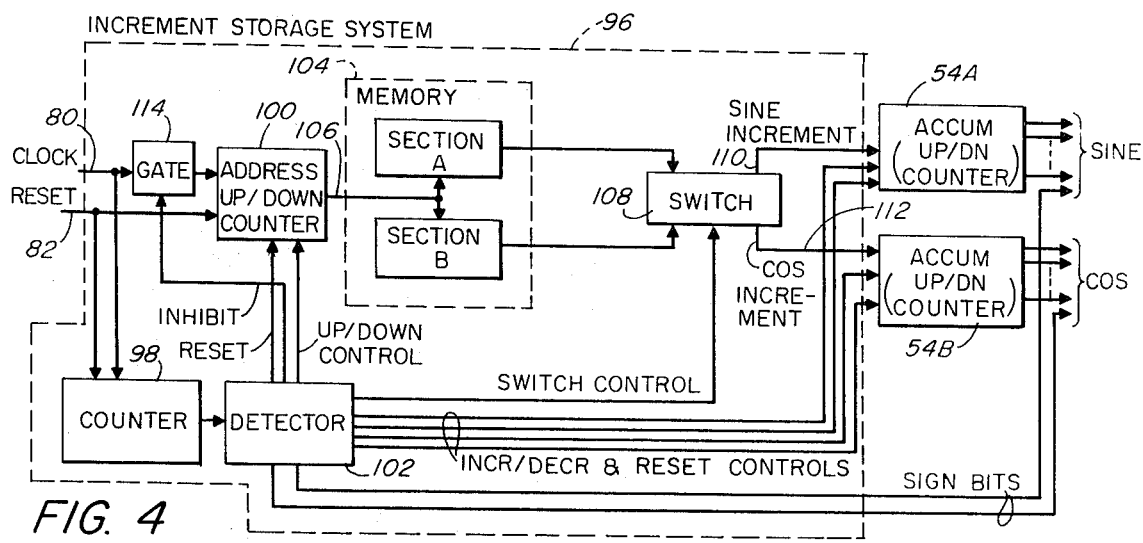
FIG 4 is a block diagram of a second alternative embodiment of the increment storage system of FIG. 2.

Referring now to FIG. 4, there is seen a block diagram of an increment storage system 96 which is an alternative embodiment to the increment storage system 50A of FIG. 2. The increment storage system 96 comprises a counter 98, an address counter 100, a detector 102, a dual section memory 104 having a section A and a sectin B which are simultaneously addressed by the address counter 100 along line 106, and a switch 108. The switch 108 and the detector 102 apply signals to the accumulators 54A-B, previously seen in FIG. 2. Since the sine and cosine increments are one-bit numbers, each accumulator 54A-B may comprise simply an up/down counter as is indicated in FIG. 4. The clock and reset signals presented on lines 80 and 82 of FIG. 2 are also provided in FIG. 4.

The operation of the increment storage system 96 provides for a saving in memory storage, this storage being implemented by the single memory 104 having a total number of storage bins equal to that of the memory 64A, with half the storage bins being provided in section A and the other half in section B of the memory 104. Increment signals are simultaneouly provided by both section A and section B to the switch 108 and these increment signals appear simultaneously on lines 110 and 112 for applying these signals to the accumulators 54A-B.

Figures 5, 6:
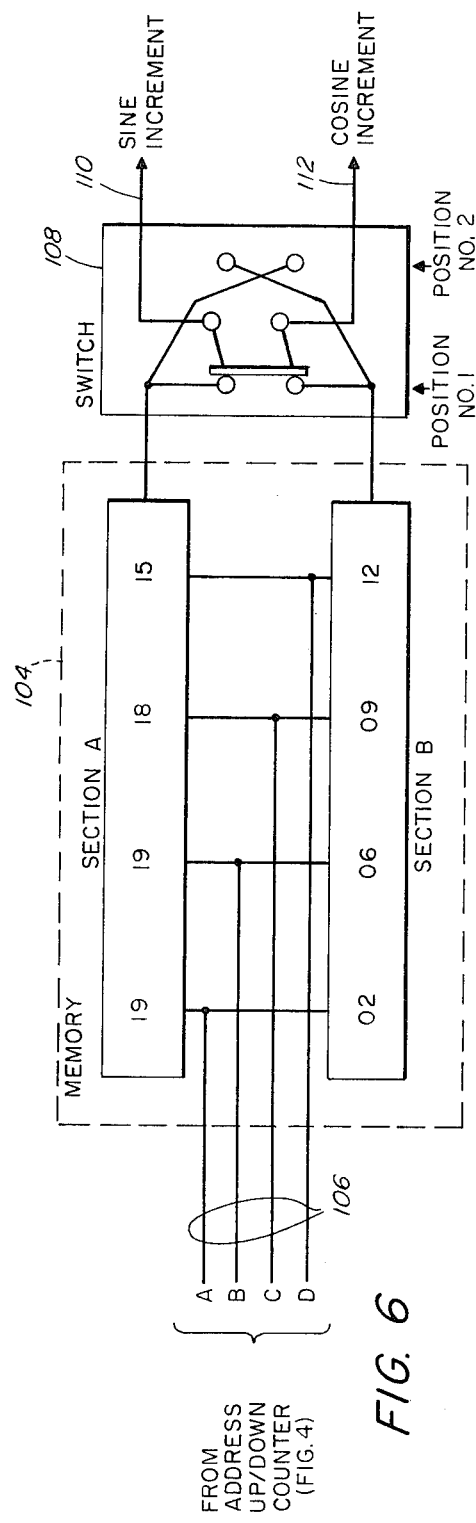
FIGS. 5 and 6 are, respectively, a table of incremental values of the sine and cosine functions and a schematic representation of the increment storage system of FIG. 4 which are useful in explaining the increment storage system of FIG. 4.

The operation of the increment storage system 96 may be more readily understood by referring to FIGS. 5 and 6 which show respectively a table of sine and cosine data including incremental changes between successive values of the sine and the cosine, and a simplified model of the memory 104 seen having stored increments corresponding to the values of the table in FIG. 5. The switch 108 is also seen in pictorial form in FIG. 6 where it is shown as a double-pole, double-throw toggle switch to demonstrate its operation, the switch 108 actually comprising an electronic switching circuit responsive to a switch control signal from the detector 102 of FIG. 4.

The tabulated data of FIG. 5 is shown with the numerals of the decimal system rather than in binary notation to simplify explanation of the figures. The first column on the left shows nine angles corresponding to eight increments in angle of rotation of the antenna 24 of FIG. 1, there being eight increments of 11.25° between each of the angles. The second and third columns show numerical values of the sine and the cosine rounded off to two decimal places. The third column shows increments in the value of the sine between successive entries of the sine in column 2 and, similarly, column 4 shows a decrement between successive values of the cosine presented in column 3. While it is understood that the embodiments of the invention presented in FIGS. 2, 3 and 4 utilize very small increments in the rotation angle of the antenna 24 such that the increment in the values of the sine and the cosine never exceeds one LSB, the tabulated data of FIG. 5 shows large increments in angle to more readily present symmetrical properties of the sine and the cosine as well as the sine increment and the cosine decrement. In this respect it is noted that the order of the numerals appearing in the third column for the cosine function is the reverse of the order of the numerals appearing in the second column for the sine function. And similarly, the order of the numerals representing the cosine decrements in the fifth column is reverse to the order of the numerals representing the sine increments in the fourth column.

The numerals of the sine increment in the fourth column are presented in FIG. 6 such that the first four increments are presented in section A while the last four increments are presented in reverse order in section B thus giving the appearance of a folded memory with the fold taking place immediately after the increment corresponding to the angle of 45°. The line 106 of FIG. 4 is portrayed in FIG. 6 as four lines labeled A, B, C, and D, each of which represents a separate addressing of a pair of storage bins, one bin of each pair being in section A while the other bin of that pair is in section B. The address corresponding to the letter A provides the increment 19 from section A and the increment 02 from section B for the switch 108. With the switch 108 in position No. 1, the increment from section B passes on to the cosine increment (or decrement depending on whether the accumulator 54B of FIG. 4 is incrementing or decrementing) on line 112 while the increment of section A is passed via switch 108 on to line 110 to appear as a sine increment. In response to four successive clock signals on the line 80 in FIG. 4, the address counter 100 of FIG. 4 advances through addresses corresponding to the letters A, B, C and D thereby transmitting via the switch 108 four successive sine increments from section A to the accumulator 54A and, simultaneously therewith, four successive increments from the section B to the accumulator 54B.

After the address counter 100 has successively addressed simultaneously each bin of section A and section B, the address counter 100 remains momentarily at the address of the last bin for the duration of one clock signal interval and then counts down. This sequence of addressing may be seen in the next to the last column in which the address D is repeated twice. Similarly, when the address counter 100 has counted down to the address A the address A is also repeated a second time before the address counter 100 counts back up. The repetition of the addressing of the storage bins at both end of the memory 104 is accomplished by means of a gate 114 in FIG. 4 through which the clock signals on line 80 pass to the address counter 100. When it is desired to repeat an address such as the address D or the address A of FIGS. 5 and 6, the detector 102 sends an inhibit signal to the gate 114 which blocks the passage of the next clock pulse signal on line 80 so that the address counter 100 does not change its count. The positions of the switch 108 for each of the addressings of the memory 104 are presented in the last column wherein it can be seen that the address counter 100 counts up from A through D while the switch 108 is in position No. 1, and the switch 108 is in position No. 2 when the address counter 100 counts down from D to A.

Again referring to FIG. 4, the detector 102 senses the count of the counter 98 and in response thereto provides the reset and the up/down control for the address counter 100 as well as the aforementioned inhibit signal to the gate 114 and the switch control to the switch 108. The providing of the sine bits, the increment-/decrement control and the reset controls by the detector 102 is accomplished in the manner analogous to that described earlier with reference to the detector 66 of FIG. 2. The counter 98 counts modulo a number proportional to one revolution of the antenna 24 of FIG. 1, and as has been noted earlier with reference to the preferred embodiment of the invention, a 10-bit accuracy in the deflection signals of the display 24 of FIG. 2 required an 11-bit count per quadrant in which case the counter 98 counts modulo 8192. The reset signal on line 82 ensures that the counter 98 presents a count of zero when the antenna 24 is oriented at an angle of 0° relative to the center line of the boat 22. The detector 102 resets the address counter 100 to a value of zero at the beginning of each quadrant.

Figure 7:
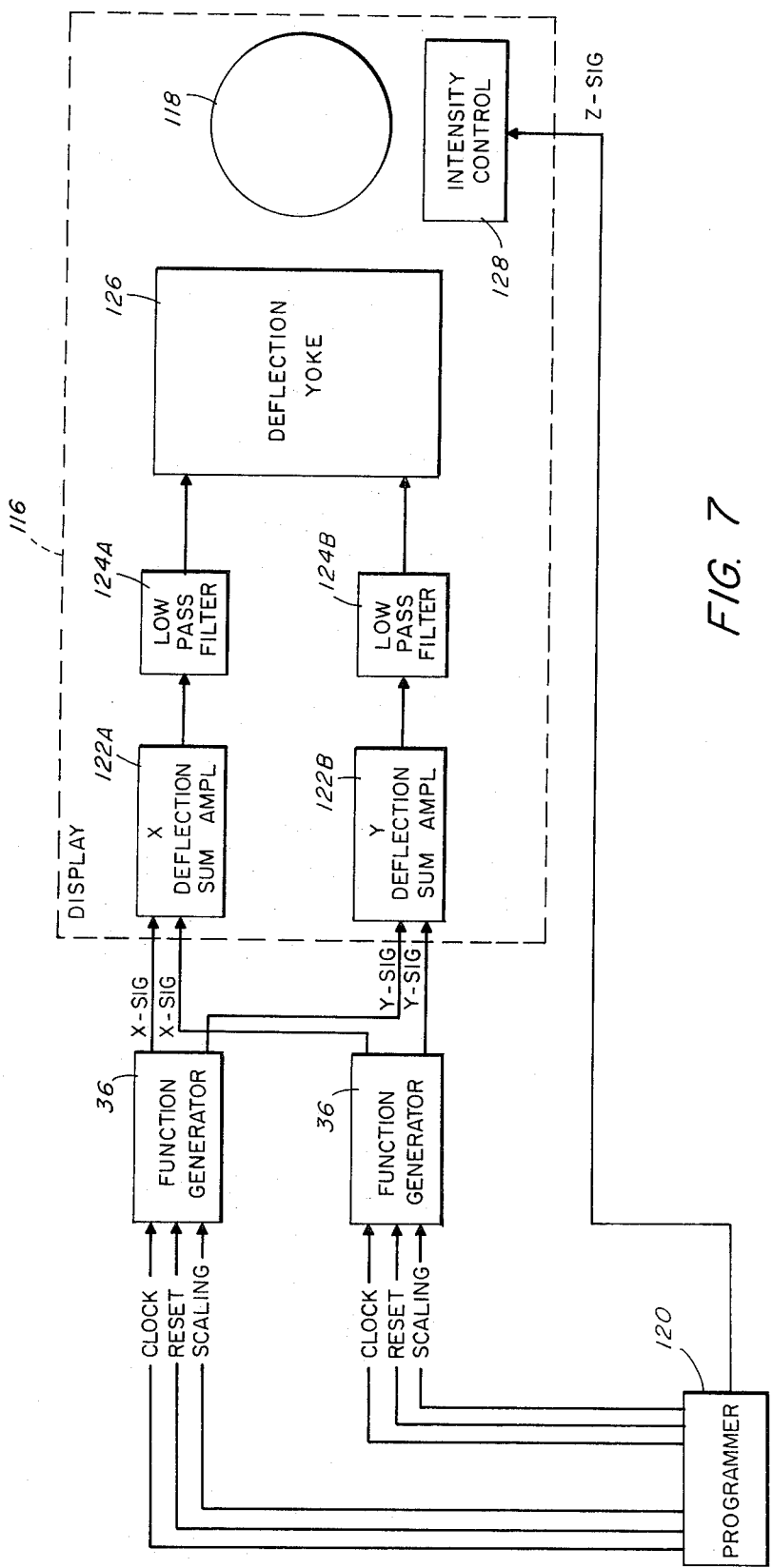
FIG. 7 is a block diagram showing the use of the coordinate generation system of FIG. 2 in providing symbols on a cathoderay tube type display having a fixed deflection yoke for deflecting the electron beam in X and Y directions.

Referring now to FIG. 7 there is shown an alternative embodiment of the invention wherein a pair of function generators 36, one such function generator having been described in FIG. 2, are utilized in providing X and Y signals to the deflection system of a display 116 for generating characters upon the face 118 of the display 116. The clock, reset and scaling signals for each function generator 36 as well as the Z axis signal for the display 116 are provided by a programmer 120. The operation of the programmer 120 is readily apparent from the operation of the system 20 as described with reference to FIG. 2. Thus, the clock and reset signals are provided periodically for addressing increments of the character generation function stored within the memory of the function generator 36 as well as resetting the address counter of the function generator 36 to zero. The scaling signal as provided by the programmer 120 controls the radial distance of each point on the trace of the character being generated on the face of the display 116. One of the function generators 36 is utilized in positioning the character on the face 118 while the second function generator 36 is utilized in tracing the actual outline of the character on the face 118. The X signals from each of the two function generators 36 are summed together at a deflection amplifier 122A and the corresponding Y signals are summed together at the deflection amplifier 122B so that the total signal applied to the deflection system of the display 116 represents the contribution of the function generator 36 providing the position of the character as well as the contribution of the other function generator 36 providing the trace of the character on the face 118. In order to provide a smooth curve to the characters being presented on the face 118 as the successive clock signals address successive bins in the memories of these function generators 36, two low pass filters 124A-B, each having a bandwidth equal, approximately, to the reciprocal of the clock signal repetition frequency, are provided for smoothing the transitions in the analog voltages of the X and Y signals, these transitions occurring whenever a new increment is applied to the accumulator of a function generator 36. The output signals of the low pass filters 124A-B are applied to the X and Y axes of deflection yoke 126 for deflecting the beam of a cathode-ray tube (represented by the face 118) for generating the trace of the face 118. An intensity control circuit 128 is provided for controlling the intensity of the trace appearing on the face 118 in response to the Z signal. While the deflection yoke 126 implies a magnetic deflection system, it is understood that electrostatic deflection could also be used as well as a two axis mechanical scribing device when a permanent paper record is desired.

Figure 8:
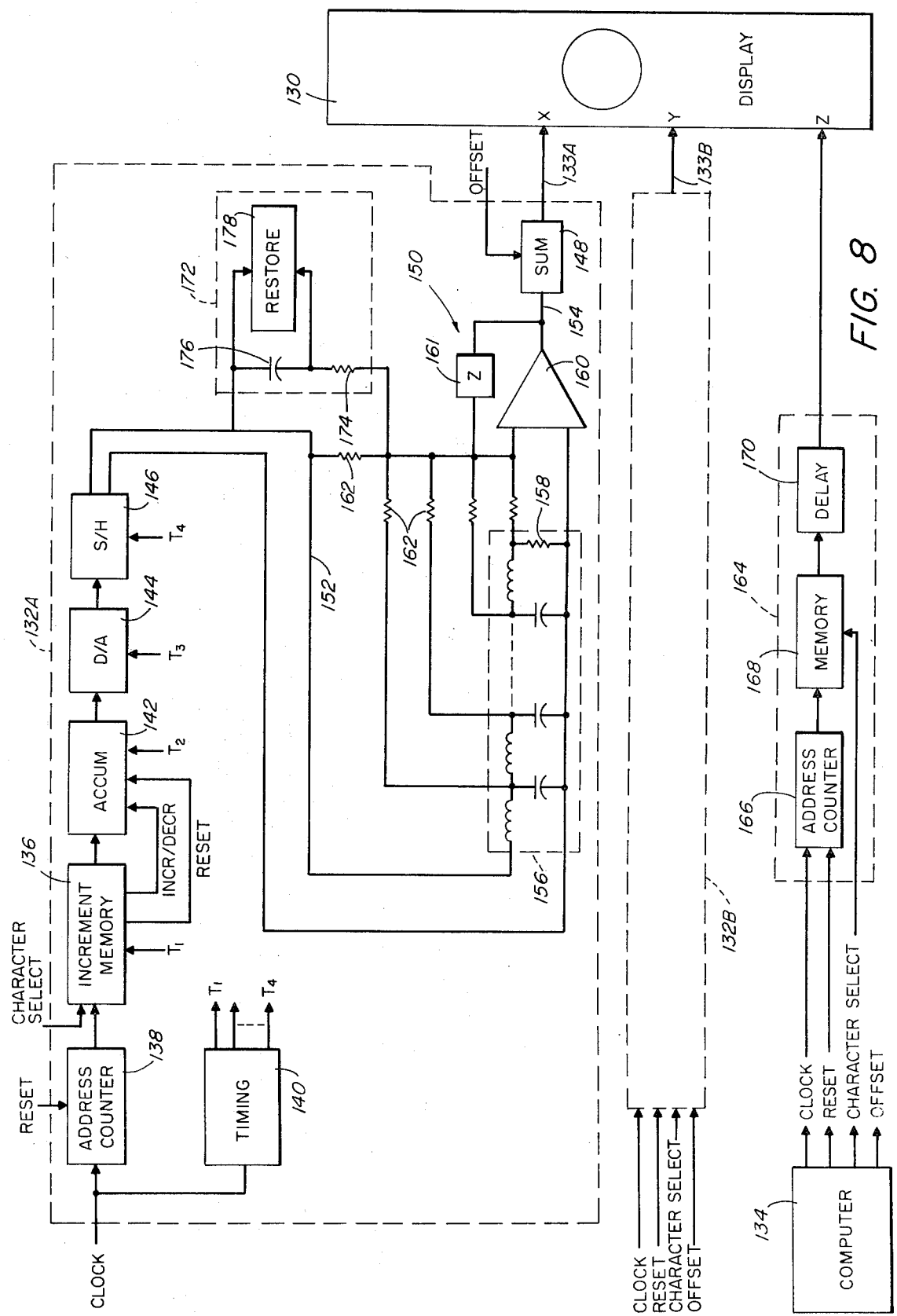
FIG. 8 is a block diagram of an alternative embodiment of the invention adapted for providing a sequence of traces having the form of a symbol.

Referring now to FIG. 8 there is seen an alternative embodiment of the invention which is particularly useful for producing a sequence of trace segments on a display 130. Two coordinate generators 132A-B provide respectively the X and the Y components on lines 133A-B of each trace segment for the display 130 in response to signals from a computer 134, these signals being clock, reset, character select and offset signals. Each of the coordinate generators 132A-B is provided with an increment memory 136, similar to the increment memory 64A of FIG. 2, which stores information with respect to a component of each trace segment so that the sequence of trace segments appearing on the display 130 has the form of a character.

The coordinate generators 132A and 132B each comprise the same components and function in the same manner so that only the coordinate generator 132A need be described. The coordinate generator 132A comprises a counter 138, a timing unit 140, an accumulator 142, a digital-to-analog converter 144, a sample and hold circuit 146, a summer 148 and a filter system 150. The counter 138 counts pulses provided by the clock signal of the computer 134 and the value of the count is used to address the increment memory 136. The maximum count of the counter 138 is equal to the maximum number of segments to be utilized in constructing a character on the display 130. After reaching this maximum count, the counter 138 is reset to zero by the computer 134. The increment memory 136 is also further addressed by the character select signal having the form of a binary number appearing on the character select line from the computer 134, the character select signal addressing a subunit of the increment memory 136 which contains the information relative to the particular character which is to be displayed while the counter 138 provides the address within the subunit to obtain the components of the individual trace segments.

The successive outputs of the increment memory 136 are accumulated by the accumulator 142 and converted to an analog signal by the digital-to-analog converter 144 in a manner similar to the operation of the accumulator 54A and the digital-to-analog converter 56A described earlier with reference to FIG. 2. The sample and hold circuit 146 samples each value of the output voltage of the digital-to-analog converter 144 whenever this voltage is updated and holds this value on line 152 until the next updating of this voltage. The timing unit 140 provides timing signals, indicated by the symbols T1–T4, in response to each pulse of the clock signal and applies these timing signals T1–T4 respectively to the increment memory 136, the accumulator 142, the digital-to-analog converter 144 and the sample and hold circuit 146 to coordinate the operations of these components in a manner well known to the art. For example, the sample and hold circuit 146 is triggered by its timing signal T4 at a fixed delay after the triggering of the digital-to-analog converter 144 by its timing signal T3 to insure that all transients within the digital-to-analog converter 144 have died out. Timing signals such as those of the timing unit 140 have not been shown in FIG. 2 since the displaying of the PPI sweeps on the display 28 occur slowly relative to the generation of the trace on the display 130 so that the effect of transients is not as significant with the system of FIG. 2; however, for increased precision, timing signals such as those of the timing unit 140 may also be employed in the system of FIG. 2. In the embodiment of FIG. 8 the increment/decrement signal for the accumulator 142 as well as the reset signal for the accumulator 142 are provided by the increment memory 136 so that the accumulator 142 can increase or decrease the value of its stored number in accordance with each portion of the character to be generated on the display 130.

The filtering system 150 smooths transitions in the output voltage on line 152 of the sample and hold circuit 146 so that the voltage on the line 152 which has the appearance of a sequence of steps corresponding to changes in the contents of the accumulator 142 is transformed to a ramp-like voltage on line 154 at the output of the filtering system 150. A preferred form of the filtering system 150 comprises a delay line 156 shown as an inductor-capacitor ladder circuit terminated with its characteristic impedance via a resistor 158, a well-known summing amplifier 160 comprising an operational amplifier with a feedback element 161 of impedance Z, and a set of summing resistors 162 coupled respectively between taps of the delay line 156 and an input to the summing amplifier 160. The various resistors 162 have differing values of resistance to compensate for attenuation in the delay line 156 so that, in response to each stepwise change in value of voltage on line 152, a succession of small step signals of substantially equal magnitude appear at the input terminal of the summing amplifier 160. The delay of the delay line 156 is approximately equal to the reciprocal of the repetition frequency of the timing signal T4 applied to the sample and hold circuit 146. The impedance Z of the feedback element 161 is selected to provide a bandwidth of the summing amplifier 160 which, in combination with the cutoff frequency of the delay line 156, attenuates the high frequency components of the staircase voltage appearing at the input to the summing amplifier 160, thereby providing the ramp-like voltage on the line 154. The offset signal of the computer 134 is a step voltage and is summed together with the vo'tage on line 154 by the summer 148 to provide the X component voltage on line 133A to the X deflection circuit, the offset signal serving to position the trace on the display 130.

Since both coordinate generators 132A–B are driven by the same signals of the computer 134, the generation of the X and the Y coordinates of each segment of the displayed trace are coordinated so that a character can be produced on the display 130. The coordinates are vectorially combined in a well-known manner, as by the X and Y deflection plates of an oscilloscope (not shown), to produce the segments of a trace. In order to produce a generally uniform writing speed on the display 130 and thereby minimize the need for modulating the Z axis for maintaining uniform brightness of the display 130, a lengthy segment of a character is preferably divided into two or more smaller strokes or segments. Each such segment is obtained by having the increment memory 136 apply a separate increment for each such segment to the contents of the accumulator 142. In this way all the portions of a character are produced during equal intervals of time so that each portion of the character is displayed with equal brightness.

The embodiment of FIG. 8 also utilizes a modulator 164 responsive to the clock, reset and character select signals of the computer 134 for modulating the Z axis of the display 130. The modulator 164 comprises a counter 166 and a memory 168 which function in a manner analogous to the counter 138 and the memory 136. Thus, for each segment of the trace as is indicated by the address provided by the counter 166, the memory 168 provides a high or a low voltage signal for blanking or unblanking the Z axis. These blanking voltages are coordinated with the ramp voltages of the coordinate generators 132A–B by the computer signals and a delay unit 170 which compensates for delays in the coordinate generators 132A–B so that the portions of the character corresponding to these ramp voltages are displayed while retrace ramp voltages of the coordinate generators 132A–B are blanked out in a manner well known to the display art.

A further feature of this embodiment of the invention is the utilization of a circuit 172 comprising a resistor 174 and a capacitor 176 serially connected between the input of the summing amplifier 160 and the output of the sample and hold circuit 146 on line 152 for improved linearity of a trace displayed on the display 130. A well-known charge restoring circuit 178 is connected across the capacitor 176 for restoring the charge to a predetermined value after each character or symbol of the trace on display 130. For example, the charge restoring circuit 178 may comprise a field effect transistor (FET, not shown) having its source and drain terminals connected to the terminals of the capacitor 176 while an activating signal voltage provided in a well-known manner in response to a signal of the timing unit 140 is transformer coupled across the source-gate terminal pair of the FET. The circuit 172 provides the improved linearity by applying an additional voltage at the inception of each trace segment to compensate for the delay in response of the deflection circuits of the display 130 and of the delay line 156 to the ramp voltage appearing at the output of the summing amplifier 160.

It is understood that the above described embodiments of the invention are illustrative only in that modifications thereof will occur to those skilled in the art. Accordingly, it is desired that this invention is not to be limited to the embodiments disclosed herein but is to be limited only as defined by the appended claims.

What is claimed is:

1. A coordinate generation system comprising:
   means for signaling incremental changes in a desired direction;
   means for displaying said direction, said display means having a deflection system utilizing a first coordinate and a second coordinate of said direction;
   means coupled to said signaling means for storing data relative to incremental changes in said first and said second coordinates, said storage means providing successive incremental coordinate changes in response to successive incremental change signals of said signaling means; and
   means interconnecting said storage means and said display means for combining successive ones of said incremental coordinate changes to provide said first and said second coordinates.

2. The system according to claim 1 further comprising means interconnecting said storage means with said signaling means for addressing stored data related to specific ones of said incremental coordinate changes.

3. The system according to claim 2 further comprising means coupled to said addressing means for controlling said combining means, said control means signaling said combining means to increment and to decrement a value of one of said coordinates.

4. The system according to claim 3 wherein said combining means comprises a digital-to-analog converter and means for selecting a positive or negative output of said digital-to-analog converter.

5. The system according to claim 4 wherein said digital-to-analog converter includes means responsive to a scaling signal for scaling the output signal of said digital-to-analog converter.

6. The system according to claim 5 further comprising a transceiver, said transceiver providing said scaling signal.

7. The system according to claim 6 wherein said transceiver is coupled to said display means, said display means displaying data provided by said transceiver.

8. The system according to claim 2 further comprising means responsive to signals of said storage means for controlling said combining means, said control means signaling said combining means to increment and to decrement the value of one of said coordinates in accordance with an incremental coordinate change provided by said storage means.

9. The system according to claim 8 wherein said combining means comprises a digital-to-analog converter and means for selecting a positive or negative output of said digital-to-analog converter.

10. The system according to claim 9 wherein said digital-to-analog converter includes means responsive to a scaling signal for scaling the output of said digital-to-analog converter, said system further comprising a transceiver providing said scaling signal, said transceiver being coupled to said display means, and said display means displaying data of said tranceiver.

11. The system according to claim 2 wherein said storage means comprises two sections, each of said sections being simultaneously addressed by said addressing means, said storage means including means for selectively coupling said combining means to each of said sections of said storage means.

12. The system according to claim 11 wherein said combining means includes a digital-to-analog converter and means for selecting a positive or negative output of said digital-to-analog converter.

13. The system according to claim 12 further comprising means coupled to said signaling means for controlling said addressing means, said combining means, said selection means of said storage means, and said selection means coupled to said digital-to-analog converter; said control means signaling said addressing means to increment its address in a forward direction and in a reverse direction, and said control means signaling said combining means to increment or decrement the value of a coordinate provided by said combining means.

14. The system according to claim 13 wherein said combining means includes means for scaling the value of a coordinate provided by said combining means.

15. In combination:
   means responsive to an angle of rotation for signaling incremental changes in said angle;
   means responsive to said incremental changes of said signaling means for generating a signal having values related in a prescribed functional manner to said incremental angular changes, said generating means comprising memory means for storing data relative to incremental values of said function for providing said incremental values, means responsive to said incremental angular changes for addressing successive portions of said memory means, and means for combining the stored functional increments of said address portions of said memory means to provide said signal having said functional relationship; and
   means for combining a plurality of said signals having said functional relationship for displaying said angle of rotation.

16. The combination according to claim 15 wherein said angle of rotation is provided by a rotating antenna, said combination further comprising means for rotating said antenna, said signaling means being driven by said rotating means in synchronism with said antenna.

17. The combination according to claim 16 further comprising transceiver means coupled to said antenna and to said means for combining said functions, said transceiver providing a scaling signal synchronized with a transmission of radiant energy via said antenna, said combining means of said function comprising means for scaling said function in accordance with said scaling signal.

18. The combination according to claim 17 wherein said combining means comprises cathode ray tube means for said displaying of said angle of rotation, said transceiver means transmitting data received by said antenna to said display means.

19. In combination:
a plurality of means for generating a function, each of said function generation means being responsive to timing signals and scaling signals;
programming means providing said timing siangals and said scaling signals to said function generation means;
each of said function generation means comprising a memory for storing incremental values of a signal waveform, successive portions of said memory being addressed successively in response to said timing signals, each of said function generation means further comprising means for combining said incremental portions of said signal waveform to produce said signal waveform, each of said function generation means including means for providing a second signal waveform, each of said signal waveforms having a magnitude determined by said scaling signals;
means for displaying symbols;
the memory in one of said function generation means providing signal waveforms representing the instantaneous values of the coordinates of a symbol displayed by said display means, the memory in a second one of said function generation means providing a signal waveform representing the values of the coordinates of the position of said symbol on said display means; and
said display means comprising means for combining the signal waveforms from each of said function generation means, means for filtering said combined signal waveforms to provide deflection signals suitable for producing said symbol, said display means further comprising means responsive to a signal of said programmer means for modulating the intensity of said display.

20. A system generating coordinates of data points suitable for presentment on a display, the system providing said coordinates in response to incremental changes in the position of an object, the system being characterized by the comprising of:
means for storing incremental values of signal waveforms representing variations in the values of said coordinates as a function of said incremental changes;
means responsive to successive ones of said incremental changes for successively addressing said storage means to extract successive ones of said stored incremental values;
means for combining said extracted values to provide the waveform of a coordinate signal; and
means utilizing said coordinates to display said data at coordinates corresponding to the position of said object.

21. In combination:
a plurality of generators, each of said generators comprising means for storing differences between values of data; and means for accumulating said differences to provide said values of data; and
means coupled to each of said generators for displaying data composed from said values of data, said displaying means including means for vectorially combining said values of each of said generators.

22. The combination according to claim 21 further comprising means coupled to each of said generators for selecting individual ones of said differences of said storage means.

23. The combination according to claim 22 further comprising means coupled between said plurality of generators and said display means for filtering said values of data.

24. The combination according to claim 23 wherein said filtering means comprises a tapped delay line, means for combining signals obtained from the taps of said delay line and means by-passing said delay line for compensating for a temporal response lag of said delay line and said display means.

* * * * *